Feb. 14, 1961  V. N. YINGLING  2,971,610
LUBRICATION SYSTEM
Filed March 2, 1960  2 Sheets-Sheet 1
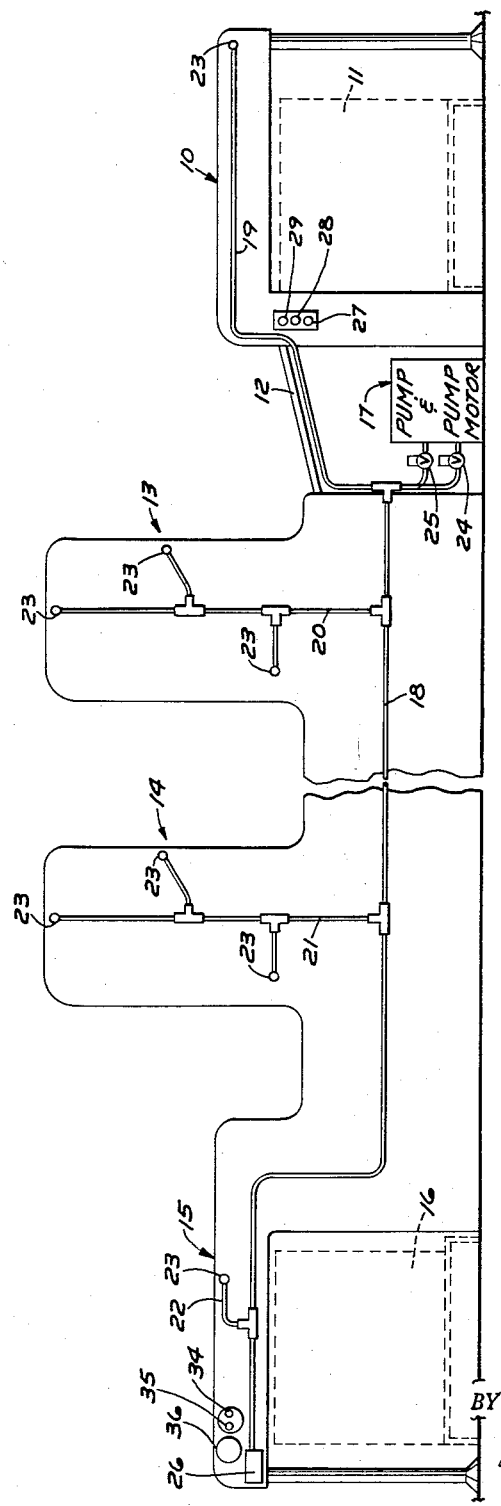
Fig. I
INVENTOR.
VICTOR N. YINGLING
BY
William Weigl
ATTORNEY

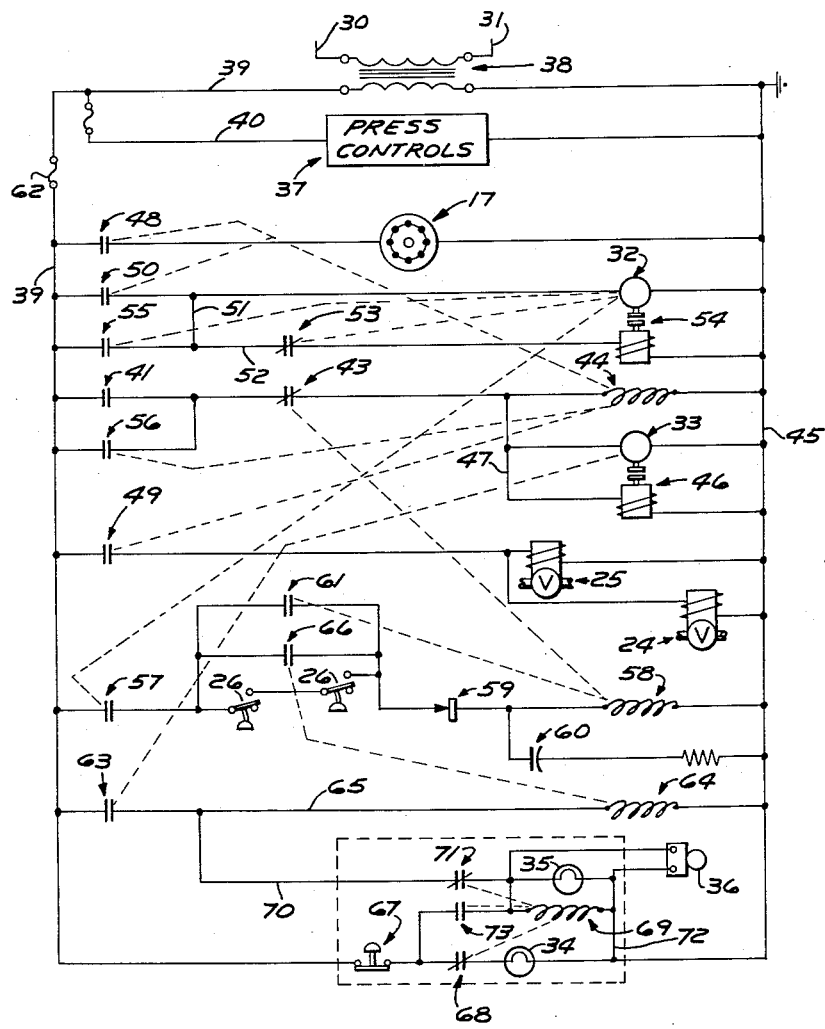

United States Patent Office 2,971,610
Patented Feb. 14, 1961

2,971,610

LUBRICATION SYSTEM

Victor N. Yingling, Cleveland, Ohio, assignor to Harris-Intertype Corporation, Cleveland, Ohio, a corporation of Delaware Filed Mar. 2, 1960, Ser. No. 12,449

7 Claims. (Cl. 184—7)

This invention relates generally to an automatic lubrication system in which lubricant is supplied to selected points of a machine during a minor portion of a substantially longer time cycle. In particular, it relates to such a system in which means is included for discontinuing lubricating upon application of a predetermined quantity of lubricant to each lubrication point, coupled with means for discontinuing the operation of the lubricating means and providing a warning signal in the event the predetermined quantity of lubricant is not supplied to the lubrication points within a certain time period.

The principal object of this invention is to provide an automatic lubrication system which is simple in construction and efficient in operation and which provides lubricant to lubrication points of a machine at predetermined time intervals.

More specifically the object of the invention is to provide means for discontinuing lubricating a machine upon the reaching of a certain lubricating condition, coupled with additional safety means timed to effect a control operation and a warning signal in the event the lubrication condition is not met within a predetermined time period.

Other objects and advantages will be apparent from the following description in which reference is made to the accompanying drawings.

According to the invention an automatic lubrication system is provided with a first reset timer for determining the frequency with which a machine is to be lubricated, a pump for supplying lubricant to the lubrication points of the machine, pressure-operated switch means for discontinuing pumping upon reaching a pressure which is indicative of the proper quantity of lubricant reaching the lubrication points, and a second reset timer adapted to discontinue the pumping action in the event the pressure operated switch fails to perform its control function within a relatively short time period. Additionally, the second timer initiates a warning signal indicating to an operator the malfunctioning of the system.

In the drawings:

Fig. 1 is a simplified side elevational view of a portion of a printing press with which the invention may be used.

Fig. 2 is a schematic wiring diagram for automatic electrical operation of the lubrication system of Fig. 1.

Referring now to Fig. 1, the printing press may comprise a pile feeder 10 which feeds sheets individually from a pile 11 down an inclined feed table 12. The sheets are registered at the bottom of the feed table and then passed through printing units 13 and 14 to a sheet delivery 15, in which they are deposited in a delivery pile 16. Since the lubrication system may be used with any type of machine which is to be periodically automatically lubricated, the printing press of Fig. 1 is shown herein merely by way of example. Presses of the type illustrated normally comprise side frames on opposite sides of the press and have printing cylinders (not shown) located between the side frames. The cylinders are journalled in bearings in the side frames. The opposite sides of such a printing press are normally called the feed side and gear side. The feed side, or side from which the press operators normally work, is the side illustrated in Fig. 1. It should be understood that the gear or remote side is substantially identical for purposes of this invention, including the points to be lubricated.

While a large multi-color sheet fed press of the type shown may require hundreds of lubrication points to be automatically lubricated on each side of the press, only a few such points are illustrated in this disclosure. The lubrication system may comprise a pump and pump motor 17, main lubrication lines 18 and 19 and branch lines 20, 21 and 22. When pressure is created by the pump in the lines 18–22, lubricant in the lines will actuate pressure operated dosers 23 to provide a certain quantity of lubricant at each lubrication point upon reaching a predetermined pressure in the lubricant lines. Such dosers are commercially available, and are adapted to either eject the predetermined quantity of lubricant when pressure is subsequently released, or to eject a previously stored quantity of lubricant each time pressure in said lines is built up. A pair of valves 24 and 25 are located in the lubricant lines to control the application of pressure to the lines on the feed side and gear side respectively. The valves 24 and 25 are both normally closed and are solenoid-operated by means soon to be described.

At the ends of the lubrication lines furthest from the pump on each of the feed and gear sides of the press are located normally open pressure-operated switches 26 which serve control functions to be described shortly.

In operation of the machine, it may be desired to automatically lubricate the various lubrication points once at the beginning of every two-hour period, for example, commencing with starting of the press and repeating the lubrication cycle every two hours. The system includes control means which permits the press to be stopped at any time in the middle of a two-hour period without again starting the lubrication cycle unless the remainder of the two-hour period has in the meanwhile elapsed. The press may be provided with several stations of electrical running and jogging control switches, one such station being illustrated on the frame of the pile feeder 10 and including a run button 27, an inch button 28 and a stop button 29. Assuming that the press is to be started at the beginning of a morning shift after being idle overnight, the main power supply illustrated by leads 30 and 31 of Fig. 2 is either already on or is turned on. With power on, the press may either be jogged by pushing the inch button 28, or may be run continuously by pushing the run button 27. Operation of either button 27 or 28 will operate controls which start the pump and pump motor 17, open the solenoid-operated valves 24 and 25 and permit the pump to put lubricant in the lines 18–22 under pressure on both sides of the press. At the same time, it will start a first electrical timer 32 and a second electrical timer 33 (Fig. 2). The timers may be conventional reset timers which are each provided with an electro-magnetically operated clutch which will maintain the timer running until the clutch is released by its power supply being cut off either during the time cycle or at the end of the time cycle by opening of contacts controlled by the timer. When deenergized, the timers 32 and 33 reset to their starting or "zero" position. Preferably, the timer 32 is set to operate for two hours and the timer 33 is set to operate for three minutes at the beginning of each two-hour time period. The timer 33 is set for a period slightly exceeding the time it takes for proper pressure in the lines 18–22 to be normally built up to actuate the pressure-operated dosers 23. Should the pressure fail to build up to the required value for any reason, for example, in case there is a leak in any of the lines or in case of malfunction of the pump or pump motor, the timer 33 will deenergize the pump and pump motor 17 and the solenoid-operated valves 24 and 25. Under normal conditions, these functions will be performed by the end-of-line pressure-operated switches 26. One purpose of the second timer is to prevent the pump from continuously pumping liquid through a leak in a line for the entire two-hour period, without at the same time providing lubrication to the points where lubricant is required.

When the system is functioning properly, a green signal light 34 will be continuously lit. If the system malfunctions so as to prevent operation of the switches 26, a warning signal will be provided by a red signal light 35 and an audible alarm such as a buzzer 36 when the second timer 33 times out. The timer 33, in addition to acting as a safety cutoff for the valves 24, 25 and the pump and pump motor 17, and as the initiator of the warning devices represented by the red light 35 and buzzer 36, also acts to deenergize its clutch and cause itself to reset.

Referring now to the electrical wiring diagram illustrated in Fig. 2, the power supply for the press controls which are generally indicated at 37 comes from the leads 30 and 31 through a transformer 38, and passes through a lead 39, a lead 40, and a lead 45. Since the details of the press control or other machine control is immaterial for this invention, suffice it to say that they include the run, inch and stop buttons 27, 28 and 29 respectively. When either one of the buttons 27 or 28 is first inaugurated, normally open contacts 41 are closed. These contacts are operatively connected to the buttons 27 and 28. This establishes a current flow from the lead 39 through the now closed contacts 41, normally closed contacts 43 to a relay coil 44, and then to lead 45 which may, if desired, be connected to ground. At the same time an electromagnetic clutch 46 and a clock of the timer 33 are energized through a lead 47. Energization of the coil 44 closes normally-open contacts 48 to initiate operation of the pump and pump motor 17 to commence building up pressure. At the same time, it closes normally open contacts 49 to cause energization of the solenoid valves 24 and 25 to open the lines 18–22 and permit build up of pressure at each of the dosers 23. In order to start timing the first two-hour lubrication cycle, the first reset timer 32 is also operated through closing of a set of normally open contacts 50 of relay 44. Timer 32 receives current from lead 39 through the now-closed contacts 50, a lead 51, a lead 52, normally closed contacts 53, and an electromagnetic clutch 54 connected to ground. Both clutches 46 and 54 will remain energized to maintain the timers 32 and 33 in operation until the clutches are again deenergized. Timer 32 is provided with a pair of normally open hold-in contacts 55 which are maintained closed by the timer 32. Coil 44 and timer 33 are held energized through normally open contacts 56 of relay coil 44, which contacts are in parallel circuit around the contacts 41 controlled by the run or inch buttons 27 and 28. The hold-in circuit through the contacts 56 provides for maintaining the system in operation during shut down of the press whenever contacts 41 are opened due to pressing of the stop button 29 any time between the beginning and end of the two-hour cycle. With the foregoing conditions being fulfilled, the motor will be running, the pump will be pumping, the valves 24 and 25 will be open, the lines 18–22 will be pressurized, and the dosers 23 will dispense a predetermined quantity of lubricant at each lubrication point either when the pressure builds up to its predetermined value or when it is subsequently released, depending upon the type of doser being used. In normal operation, with the particular printing press shown, the pressure in the lines shall have built up sufficiently in one to one-and-one-half minutes, at which time the pressure-operated switches 26 at the ends of the lines on both the feed and gear sides of the press will close. These switches are shown in Fig. 2 as being in series with each other and with normally open contacts 57 which are controlled by the timer 32 to close as soon as the timer 32 starts operation. Closing of the switches 26 energizes a relay coil 58 through the lead 39, the now closed contacts 57, the two switches 26, a rectifier 59 and the lead 45. A capacitor 60 is placed in parallel circuit around the coil 58 for purposes to be mentioned later. Immediately upon energization of the coil 58 a pair of normally open contacts 61 operated by the coil 58 are closed to provide a hold-in circuit around the pressure operated switches 26 to prevent subsequent opening of the switches 26 from deenergizing the relay coil 58. In addition, the normally closed contacts 43 are operated to their open condition by the energization of relay coil 58 to break the power supply to the second reset timer 33 and its clutch 46. This resets the second timer to "zero," in which condition it will remain until a new two-hour timing cycle is later started by the first timer. It is to be understood that the contacts 57 will maintain the relay coil 58 energized for the remainder of the two-hour period. The contacts 57, as was mentioned earlier, are controlled by the first timer 32 and do not open until the end of the two-hour period. Since the coil 58 will be energized for the remainder of the cycle, its contacts 43 in circuit with the first timer 33 will likewise remain open for the remainder of the time cycle.

At the same time that the second reset timer 33 was deenergized through opening of contacts 43, the relay 44 was deenergized opening each of its contacts 48, 50, 56 and 49. Opening of contacts 48 stops the motor and pump from creating further pressure. Opening of contacts 49 enables both valves 24 and 25 to return to their closed conditions in which they normally permit the pressure in lines 18–22 to be relieved. Opening of the contacts 50 and 56 will prevent the reestablishment of the time cycle in the event the contacts 41 are open at the end of the two-hour period.

Assuming that there are no leaks in the lubrication lines and that the entire system is functioning properly, and further assuming that the press is in operation at the end of the two-hour cycle, a new lubrication cycle will be commenced after the first two-hour period is discontinued, as follows. The first timer 32 will open its normally closed contacts 53 momentarily to deenergize the clutch 54 and permit the timer to reset to "zero." When the timer resets, its contacts 55 will reopen thus preventing operation of the timer 32 until certain other conditions are met. Timer 32 also reopens its contacts 57 at the end of the two-hour cycle to break current flow to the relay coil 58. In order that a new two-hour cycle may now be started, it is required that the contacts 43 of the relay 58 be closed. The capacitor 60 provides current momentarily to the relay coil 58 after contacts 57 are first opened to maintain the contacts 43 open sufficiently long enough to enable the timer 32 to perform its various functions as previously mentioned at the end of the time cycle. As the charge of the capacitor 60 is dissipated, the contacts 43 will return to their closed position, commencing a new lubrication cycle through the already closed contacts 41, the contacts 43, etc. Contacts 61 of the relay coil will also be opened to prevent operation of the coil 58 when the contacts 57 in series therewith are closed by the first timer 32 as the new cycle begins.

The foregoing cyclical operation of the automatic lubrication system will be repeated continuously, provided the contacts 41 are closed at the end of a two-hour cycle. If the contacts 41 are open, the cycle will not repeat upon reclosing of the contacts 43, until the contacts 41 are again closed at some later time. If the press is shut down only temporarily, a new lubrication cycle will commence when the press is again either run or inched forward. If the contacts 41 are opened because the work shift has ended, the control system will shut off automatically at the end of that particular two-hour period and will remain off until the press is again operated the following day. If, at any time, a fuse 62 located in line 39 is pulled in the middle of a lubrication cycle, the timers 32 and 33 will reset, and restoration of the fuse will start a new cycle whenever contacts 41 are closed. On certain occasions, such as installation or maintenance work, it is desirable to pull fuse 62 to prevent overlubrication.

The foregoing describes the manner in which the control system will operate under normal conditions. However, if a lubricant line is leaking at any point, sufficient to prevent the pressure from building up enough to operate the end-of-line switches 26, the dosers 23 will be prevented from supplying lubricant to their respective points, and the pump and pump motor 17 will continue to operate and the valves 24 and 25 will stay open for the remainder of the cycle, unless some safety device is provided to determine whether the pressure operated switches 26 have performed their necessary functions. To accomplish this latter end, the timer 33 is adapted to shut off the pump and pump motor 17, to permit closing of the valves 24 and 25, to sound an audible and provide a visual alarm, and to reset itself. When the timer 33 times out at the end of three minutes without both switches 26 having been closed, normally open contacts 63 operated by the timer 33 at the end of the three minute period will close to cause energization of a relay coil 64 through the lead 39, the now closed contacts 63, a lead 65, the coil 64, and then to the lead 45. Operation of the relay coil 64 effects closing of normally open contacts 66 which are located in parallel circuit around the pressure-operated switches 26 so that the relay coil 58 may be operated and now perform the identical functions ordinarily performed by closing of the switches 26. This safety system will shut off the pump and pump motor 17 and permit closing of the valves 24 and 25. Whether the coil 58 is operated either by the switches 26 or through the control function of the timer 33, in each case the clutch 46 of the timer 33 will be deenergized to cause resetting of the timer 33 until a new cycle is started.

The alarm signal is also controlled by timing out of the timer 33 to indicate that the lubrication system is functioning improperly for some reason. As mentioned previously, the alarm is both visual and audible. During normal operation the green light 34 will be lit through the lead 39, a reset button 67, normally closed contacts 68 of a relay coil 69, the filament of the green light 34 and the lead 45 to ground. The green light 34 will operate continuously when the system is functioning properly. When a malfunction prevents deactivation of the lubricating portion of the cycle by the pressure operated switches 26 and causes the timer 33 to perform the deactivation function instead, closing of the contacts 63 of the second timer 33 causes actuation of the relay coil 69 through the lead 39, the now closed contacts 63, a lead 70, normally closed, late-opening contacts 71 of the relay coil 69, and a lead 72 connected to lead 45. Energization of coil 69 opens its normally closed contacts 68 and 71 and closes its normally open contacts 73. At the time the coil 69 was energized through contacts 71, the red light 35 was illuminated and the buzzer 36 was sounded. The coil 69 in closing its contacts 73 maintains itself, the buzzer 36, and the red light 35 energized, and in opening contacts 68 extinguishes the green light 34. The operator, upon receiving the alarm signal from the buzzer 36 and red light 35 can extinguish these alarms by pressing the reset button 67 to deenergize the coil 69, thus permitting the green light 34 to be reestablished as the normally closed contacts 68 of the coil 69 are restored to their original condition. He must then repair whatever caused the malfunctioning of the system which prevented closing of the end-of-line pressure-operated switches 26.

It can be seen that what I have provided is a lubrication system which lubricates certain points of a machine at predetermined intervals, with lubricant always being provided when the machine is initially started, and with the lubrication portion of a time cycle being discontinued either upon reaching a certain lubrication condition under normal operation, or being discontinued by a timed safety device in the event the certain condition is not met for any reason.

Various modifications may be made without departing from the spirit and scope of the invention.

Having described my invention, I claim:

1. In an automatic lubrication system for applying lubricant to a plurality of lubrication points of a machine during a minor portion of a predetermined time cycle which is substantially longer than said minor portion, a pump for the lubricant, a motor for initiating and maintaining operation of the pump, a fluid line extending from said pump to the lubrication points, a pressure-operated doser at each of said lubrication points adapted to deliver a preselected quantity of lubricant each time the pressure in said line is built up, a solenoid-operated normally closed valve in the fluid line intermediate the pump and said lubrication points, a first reset timer adapted to be operated throughout said predetermined time cycle and automatically reset to its starting position at the end of said cycle, means for initiating operation of the first timer, motor and valve solenoid in response to operation of the machine, a pressure-operated normally open switch in said fluid line adapted to be closed upon creation of a predetermined pressure in the line by the pump, said predetermined pressure being at least as great as that required to operate the pressure-operated dosers, means actuated by closing of the pressure-operated switch for deenergizing the motor and the valve solenoid, means operated by the first timer at the end of said time cycle to repeat the lubrication cycle if the machine is in operation at the end of the cycle, a second reset timer operated only during the selected minor portion of the time cycle, and means operated by the second timer for deenergizing the pump motor and valve solenoid at the end of the selected minor portion of the cycle in the event the pressure-operated switch fails to close.

2. The invention set forth in claim 1 wherein the pressure-operated switch is operatively connected to the second timer to deenergized the second timer at the time the motor and valve solenoid are deenergized.

3. The invention set forth in claim 1 wherein the means operated by the first timer to repeat the cycle includes normally closed electrical contacts in the circuit for the second timer, which contacts are opened when the pressure-operated switch is closed and are maintained open for the remainder of the cycle, and means temporarily delaying the reclosing of said contacts when the first timer times out.

4. The invention set forth in claim 1 including means providing an alarm signal actuated in response to deenergization of the motor and valve solenoid by the second timer.

5. In an automatic lubrication system for applying lubricant to a plurality of lubrication points of a machine during a minor portion of a predetermined time cycle which is substantially longer than said minor portion, a pump for said lubricant, an electric motor for initiating and maintaining operation of said pump, a plurality of fluid lines extending from said pump to selected ones of the lubrication points, a pressure-operated doser at each of said lubrication points adapted to deliver a preselected quantity of lubricant each time the pressure in said lines is built up, a solenoid-operated normally closed valve in each of said fluid lines intermediate the pump and said lubrication points, a first electric reset timer adapted to be operated throughout said predetermined time cycle and automatically reset to its starting position at the end of said cycle, means for initiating operation of the first timer, motor and valve solenoids in response to operation of the machine, a pressure-operated normally open switch in each of said fluid lines adapted to be closed upon creating of a predetermined pressure in each line, said predetermined pressure being at least as great as that required to operate the pressure-operated dosers, said pressure-operated switches being series-connected, means actuated by closing of both pressure-operated switches for deenergizing the motor and the valve solenoid, means operated by the first timer at the end of said time cycle to repeat the lubrication cycle if the machine is in operation at the end of the cycle, a second electric reset timer operated only during the selected portion of the time cycle, and means operated by the second timer for deenergizing the pump motor and valve solenoid at the end of the selected minor portion of the cycle if either one of the pressure operated switches fails to close, said pressure-operated switches acting also to deenergize and reset the second timer at the time the motor and valve solenoids are deenergized.

6. The invention set forth in claim 1 wherein the means operated by the first timer to repeat the cycle includes normally closed electrical contacts in the circuit for the second timer, which contacts are opened when both pressure-operated switches are closed and which contacts are maintained open for the remainder of the cycle, and means temporarily delaying the reclosing of said contacts when the first timer times out.

7. The invention set forth in claim 5 including means providing an alarm signal actuated in response to deenergization of the motor and valve solenoid by the second timer.

References Cited in the file of this patent

UNITED STATES PATENTS

| | | |
|---|---|---|
| 1,914,900 | Tarbox | June 20, 1933 |
| 2,038,287 | Hawks et al. | Apr. 21, 1936 |
| 2,048,003 | Hawks | July 21, 1936 |
| 2,206,335 | Rotter et al. | July 2, 1940 |
| 2,461,076 | Neeson | Feb. 8, 1949 |
| 2,521,615 | Walker | Sept. 5, 1950 |
| 2,563,834 | Gillespie | Aug. 14, 1951 |
| 2,616,523 | Davis | Nov. 4, 1952 |
| 2,765,050 | Klein et al. | Oct. 2, 1956 |